US008326816B2

United States Patent
Colle et al.

(10) Patent No.: US 8,326,816 B2
(45) Date of Patent: Dec. 4, 2012

(54) FINE GRAIN SYNCHRONIZATION FOR DATABASE REPLAY

(75) Inventors: Romain Colle, San Francisco, CA (US); Benoit Dageville, Foster City, CA (US); Karl Dias, Foster City, CA (US); Leonidas Galanis, San Jose, CA (US); Supiti Buranawatanachoke, San Mateo, CA (US); Jonathan Klein, Redwood City, CA (US); Efstratios Papadomanolakis, San Francisco, CA (US); Yujun Wang, Los Gatos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 203 days.

(21) Appl. No.: 12/775,322

(22) Filed: May 6, 2010

(65) Prior Publication Data

US 2011/0276550 A1 Nov. 10, 2011

(51) Int. Cl.
*G06F 17/30* (2006.01)

(52) U.S. Cl. ........................................ 707/705; 707/802

(58) Field of Classification Search .................... 707/705
See application file for complete search history.

(56) References Cited

U.S. PATENT DOCUMENTS

| | | | |
|---|---|---|---|
| 5,440,735 A | 8/1995 | Goldring | |
| 5,448,739 A | 9/1995 | Jacobson | |
| 6,041,344 A | 3/2000 | Bodamer et al. | |
| 6,236,997 B1 | 5/2001 | Bodamer et al. | |
| 6,253,228 B1 * | 6/2001 | Ferris et al. | 709/203 |
| 6,629,313 B1 | 9/2003 | Rowe et al. | |
| 7,076,480 B2 | 7/2006 | Scardo et al. | |
| 2002/0152188 A1 | 10/2002 | Crus et al. | |
| 2003/0093499 A1 | 5/2003 | Messinger et al. | |
| 2003/0172091 A1 * | 9/2003 | Norcott | 707/203 |
| 2004/0015600 A1 * | 1/2004 | Tiwary et al. | 709/234 |
| 2004/0221115 A1 | 11/2004 | Sahin et al. | |
| 2005/0131879 A1 | 6/2005 | Ghosh et al. | |
| 2005/0131881 A1 | 6/2005 | Ghosh et al. | |
| 2005/0172029 A1 | 8/2005 | Burke et al. | |
| 2006/0248119 A1 | 11/2006 | Stanev et al. | |
| 2008/0097960 A1 | 4/2008 | Dias et al. | |
| 2008/0097961 A1 * | 4/2008 | Dias et al. | 707/2 |
| 2008/0097995 A1 * | 4/2008 | Dias et al. | 707/8 |

(Continued)

OTHER PUBLICATIONS

Yujun Wang at.al., "Real Application Testing with Database Relay", 2009.*

(Continued)

*Primary Examiner* — Binh V Ho
(74) *Attorney, Agent, or Firm* — Hickman Palermo Truong Becker Bingham Wong LLP

(57) ABSTRACT

A method, apparatus, and computer readable medium for preserving data dependency during replay of database commands without strictly preserving a global ordering of the database commands is provided. A capture process captures a workload of database commands executed by a production system. The captured workload includes object identifiers that identify database objects that were referenced directly or indirectly during execution of the database commands by the production system. The captured workload also includes an indication of whether the database objects were potentially read or written during execution of the commands. The workload is processed to determine that an object accessed during execution of a command was previously modified during execution of one or more other commands. A replay process on a test database system prevents the command from being replayed until after the one or more other commands have been replayed to modify the object.

24 Claims, 6 Drawing Sheets

U.S. PATENT DOCUMENTS

2008/0097996 A1\* 4/2008 Dias et al. .................. 707/8
2008/0098003 A1\* 4/2008 Dias et al. ................. 707/10
2009/0106219 A1 4/2009 Belknap et al.
2009/0106321 A1\* 4/2009 Das et al. ................. 707/200

OTHER PUBLICATIONS

Leonidas Galanis et.al., "Oracle Database Replay", 2008.\*
Inderpal S. Johal, "Oracle 11g Database Relay", 2007.\*
U.S. Appl. No. 11/800,122, filed May 3, 2007, Notive of Allowance, Oct. 27, 2010.
U.S. Appl. No. 11/800,224, filed May 3, 2007, Final Office Action, Jul. 13, 2010.
U.S. Appl. No. 11/800,122, filed May 3, 2007, Final Office Action, Aug. 27, 2010.
U.S. Appl. No. 11/800,238, filed May 3, 2007, Office Action, Aug. 31, 2010.
U.S. Appl. No. 11/800,239, filed May 3, 2007, Notice of Allowance, Oct. 14, 2010.
U.S. Appl. No. 11/800,122, filed May 3, 2007, Notice of Allowance, May 12, 2011.
U.S. Appl. No. 11/800,238, filed May 3, 2007, Notice of Allowance, Nov. 17, 2010.
U.S. Appl. No. 12/870,736, filed Aug. 27, 2010, Office Action, Apr. 25, 2012.

\* cited by examiner

FIG. 2A

| THREAD 1 | THREAD 2 | THREAD 3 | SCN |
|---|---|---|---|
| UPDATE T1 | | | 1 |
| | READ T1 | | 1 |
| COMMIT | | | 2 |
| | READ T1 | | 2 |
| | | READ T2 | 2 |
| | | UPDATE T2 | 2 |
| | | COMMIT | 3 |
| READ T1 | | | 3 |
| | READ T1 | | 3 |

FIG. 2B

| CALL | SCN | THREAD | TABLES READ | TABLES WRITTEN |
|---|---|---|---|---|
| UPDATE T1 | 1 | 1 | T1 | - |
| READ T1 (1) | 1 | 2 | T1 | - |
| COMMIT (1) | 2 | 1 | T1 | T1 |
| READ T1 (2) | 2 | 2 | T1 | - |
| READ T2 | 2 | 3 | T2 | - |
| UPDATE T2 | 2 | 3 | T2 | - |
| COMMIT (2) | 3 | 3 | T2 | T2 |
| READ T1 (3) | 3 | 1 | T1 | - |
| READ T1 (4) | 3 | 2 | T1 | - |

FIG. 3A

| CALL | CALL TO WAIT FOR |
|---|---|
| READ T1 (2) | COMMIT (1) |
| READ T1 (3) | COMMIT (1) |
| READ T1 (4) | COMMIT (1) |

FINE GRAIN SYNCHRONIZATION FOR DATABASE REPLAY

CROSS-REFERENCE TO RELATED APPLICATIONS

This application is related to: (1) U.S. Pat. App. No. 60/853,271, entitled "Database Workload Capture And Replay Architecture," filed Oct. 20, 2006, the entire contents of which is hereby incorporated by reference as if fully set forth herein; (2) U.S. patent application Ser. No. 11/800,122, entitled "Database Workload Capture And Replay Architecture," filed May 3, 2007, the entire contents of which is hereby incorporated by reference as if fully set forth herein; (3) U.S. patent application Ser. No. 11/800,240, entitled "Database Workload Replay Remapping Infrastructure," filed May 3, 2007, the entire contents of which is hereby incorporated by reference as if fully set forth herein; (4) U.S. patent application Ser. No. 11/800,238, entitled "Transactionally Consistent Database Workload Replay," filed May 3, 2007, the entire contents of which is hereby incorporated by reference as if fully set forth herein; (5) U.S. patent application Ser. No. 11/800,224, entitled "Client-Driven Functionally Equivalent Database Replay," filed May 3, 2007, the entire contents of which is hereby incorporated by reference as if fully set forth herein; (6) U.S. patent application Ser. No. 11/800,239, entitled "Capturing Database Workload While Preserving Original Tranactional And Concurrency Characteristics For Replay," filed May 3, 2007, the entire contents of which is hereby incorporated by reference as if fully set forth herein. The applicant(s) hereby rescind any disclaimer of claim scope in the related application(s) or the prosecution history thereof and advise the USPTO that the claims in this application may be broader in some respects than any claim in the related application(s). Collectively, these six related applications are referred to as the "Workload Capture and Replay" applications.

FIELD OF THE INVENTION

The present invention relates to capturing a workload in one database system and replaying that workload in another database system.

BACKGROUND

Database Systems

A database management system ("DBMS") manages a database. A database management system may comprise one or more database servers. A database comprises database data and metadata that is stored on a persistent memory mechanism, such as a set of hard disks. Metadata defines database objects, such as relational tables, table columns, view, and triggers.

Database applications and clients interact with a database server by submitting to the database server commands that cause the database server to perform operations on data stored in a database by executing the commands against the database. A database command may be in the form of a database statement that conforms to a database language. A language for expressing database requests is the Structured Query Language (SQL). There are many different versions of SQL, some versions are standard and some proprietary, and there are a variety of extensions. SQL data definition language ("DDL") instructions are issued to a database server to create or configure database objects, such as tables, views, or complex data types. SQL/XML is a common extension of SQL used when manipulating XML data in an object-relational database. Although the examples are described based on Oracle's SQL, the techniques provided herein are not restricted to any particular version of SQL or to any particular form of database command.

Testing and Validating a Database System

Large business-critical applications are complex and experience highly varying load and usage patterns. These applications are expected to provide certain service guarantees in terms of response time, throughput, uptime, and availability. At times, it may be desirable to change a system that includes such applications. Such a change might involve upgrading the system's database server or modifying a configuration, for example. However, before any change is made to a production system, extensive testing and validation should be performed in a test system. In order to be confident that a change will not cause problems (e.g., errors or performance issues) in the production system once that change is introduced into the production system, a system tester should try to expose the test system to a workload that is very similar to the workload that the production system would actually experience in a real world environment.

Many other approaches have not been able to replicate a real production workload in a test system. According to one approach, a set of test scripts is written to test commonly executed code paths. Although this approach can be useful for performing regression testing and functional testing, this approach does not mimic a production workload. This approach usually stresses the testing system only to a very minimal extent.

Under another approach, human users are asked to use the test system as though the test system were a production system. However, this approach is very random and non-deterministic. This approach often fails to reproduce the load patterns that would be experienced in an actual production environment.

Database Workload Capture and Replay

Under a Database Workload Capture and Replay architecture developed by Oracle, Inc., as described in the Workload Capture and Replay applications that have been incorporated by reference herein, a test database system is exposed to a workload in the same commit order that the production database system originally processed the workload. However, the test database system may take more or less time to process some transactions than the production database system. Because the order of transactions is strictly preserved, the test system may unnecessarily wait for some transactions to complete before processing other transactions. Strictly preserving the order of transactions may be sub-optimal for the test system.

On the other hand, allowing the test system to process the transactions out of order may cause the test data maintained by the test system to diverge from the production data as it was maintained in the production system. In other words, a transaction executed out of order by a test system may no longer read or modify the data that was read or modified by a same or similar transaction in the production system, resulting in a test workload that is misrepresentative of the production workload. Also, a transaction executed out of order may cause the test system to break by, for example, reading or modifying data that does not yet exist.

What is needed is a technique that allows a test system to process a workload in a manner that: (a) is not strictly tied to the order of execution by a production system; and (b) converges to a same or similar state of data as the production system and does not break when processing transactions in a different order than the production system.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 2A and 2B are tables showing information in a sample workload that is captured according to an embodiment described herein;

FIGS. 3A and 3B are dependency graphs constructed for a sample workload according to an embodiment described herein.

DETAILED DESCRIPTION

Figure 1:
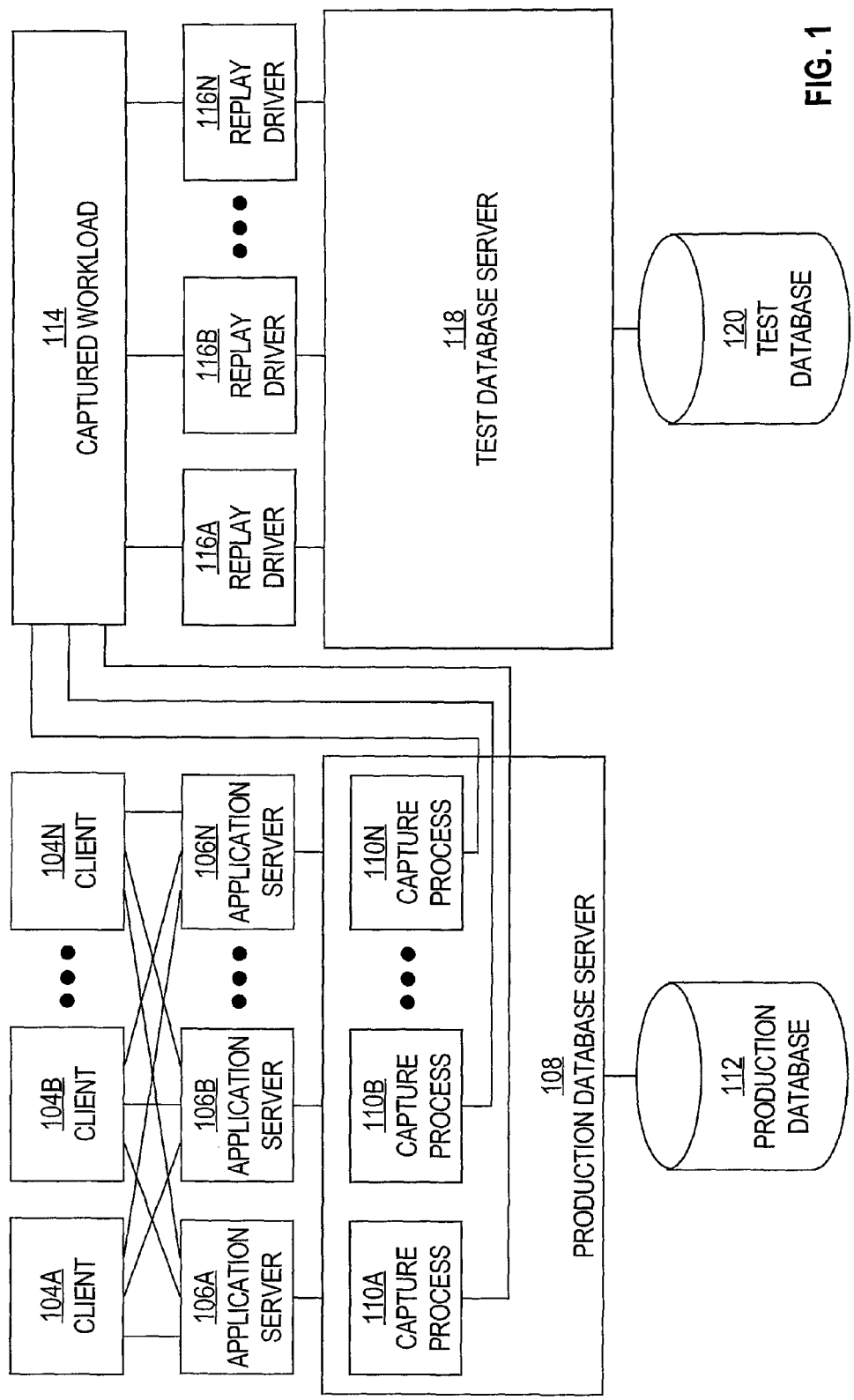
FIG. 1 is a block diagram that shows an example of a system in which workload that is submitted to a production database server is captured and replayed to a test database server, according to an embodiment described herein.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

According to one embodiment, a production database system executes one or more commands received from one or more clients. A workload describing the one or more commands is captured, and the captured workload includes object identifiers that identify database objects that were referenced directly or indirectly by the one or more commands that were executed by the production database system. The captured workload also includes an indication of whether the database objects were read or written when the production system executed the commands. A workload of captured object identifiers, captured indications of whether the objects were read and/or written, and captured database commands may be processed to determine that an object accessed when the production system executed a command may have been previously modified when the production system previously executed one or more other commands. During replay, a replay process on a test database system prevents execution of a command that accessed a previously modified object until the one or more other commands have been executed to complete one or more previous modifications to the object. The test database system may execute commands in a different order than the commands were originally executed in the production system even though one or more of the commands depend on one or more other commands. In one embodiment, although the commands are executed in a different order, the test data maintained in the test system does not diverge from the production data that was maintained in the production system.

One command may be said to be "dependent" upon another command when execution of the one command caused the production system to access an object that was previously modified during execution of the other command. The dependency of one command to another command may be determined by processing a captured workload that identifies the objects accessed and/or modified during execution of the commands. Also, a command may be said to "access" an object if execution of the command by a database server potentially causes the database server to access the object. For example, execution of a command that references a view causes the database server to access a table upon which the view is based. In this manner, the command may be said to "access" the table or "use" the table since the database server, through execution of the command, is accessing or using the table. As another example, a command may be said to "access" a table if execution of the command causes the database server to obtain a lock on the table, even if the database server does not in fact access the table when executing the command.

The object identifiers may identify any type of database object in the database. In one embodiment, the object identifiers are table identifiers that identify tables. Table identifiers may be captured to identify the tables that were accessed and/or modified by a command. In a particular embodiment, those tables that were accessed and/or modified by a command may be identified from a cursor that stores information about the tables that were accessed and/or modified by the command. For example, the cursor may provide information that identifies the tables in which locks were required in order to execute the command. If a command reads or modifies a table, then the production database system may obtain a lock on the table in the process of executing the command. The lock may be one of many different types of locks (for example, a shared lock or an exclusive lock), and the type of lock obtained may provide information about whether the command accessed and/or modified the table. For example, a command with an exclusive lock on an object may be presumed to have modified the object. A command with a shared lock on an object may be presumed to have accessed the object without modifying it.

The workload may be used to determine that a second command depends on a first command. For example, a second command depends on a first command if, during production, the second command accesses an object that was previously modified by the first command. In response to determining that the second command depends on the first command, a workload processing system may store an indication that the second command should not be executed until after execution of the first command when the workload is replayed. For example, the indication may be used by a replay process on the test system to prevent the second command from being executed until after execution of the first command during replay. In one embodiment, the indication triggers the replay process to execute the second command after the first command has been executed during replay.

In one embodiment, a second command that depends on a first command is encountered by a replay process during a replay of the commands. The replay process determines that the first command has not yet been executed during the replay.

In response to determining that the first command has not yet been executed, the replay process waits to execute the second command. In one embodiment, the replay process determines that the first command has not yet been executed by accessing a counter associated with a replay driver from which the first command is to be received. The counter records a count of a most recently executed command by the corresponding driver, or by a corresponding thread emulated by the driver. For example, the test database system may determine that the first command has not yet been executed when the first command is associated with a count that is greater than the count of the most recently executed command for that thread.

In one embodiment, the first command is received and executed by the test database system after the second command is received. The replay process determines that the first command has been executed and, in response, causes the second command to be executed on the test database system. In one embodiment, the replay process determines that the first command has been executed by accessing the count associated with a thread from which the first command is sent. For example, the replay process may determine that the first command has been executed when the first command is associated with a count that is less than or equal to the count of the most recently executed command from the thread. In one embodiment, the count for each thread stores only the count of the most recently executed command for that thread.

In one embodiment, information such as a dependency graph is stored to indicate that a second command that was executed in a production system depends on a first command that was previously executed in a production system. The dependency graph may be constructed based on the workload captured by the production system. In one embodiment, during replay, the second command is not executed by the test database system before the test database system has executed the first command. The dependency graph may be accessed to determine that the second command depends on the first command. In one embodiment, a replay process determines if the dependency is satisfied by determining if the first command has already been executed during replay. For example, a shared counter may be stored for each thread indicating a last executed command for the thread. The replay process may check the shared counter for a thread associated with the first command to determine whether the first command has been executed by the thread during replay. If the first command has not yet been executed during replay, then the dependency is not satisfied. In response to determining that the dependency is not satisfied, the replay process waits to execute the second command until the first command has been executed during replay. Other commands not directly or indirectly dependent upon the first command may be executed while waiting for the first command.

In one embodiment, the information used for synchronizing a replay of the commands does not include a time that the first or the second commands were executed in the production system. In other words, the commands may be synchronized based on a dependency graph alone without referencing a logical time that the commands were executed by the production system. A global ordering of replayed commands, including a global ordering of replayed commands to commit changes, does not need to be determined before the workload is replayed in the test system. The dependency graph may be constructed based on an ordering of commands and object identifiers accessed or modified by the commands. Once the dependency graph is constructed, the commands may be replayed in any order that satisfies the dependency graph. In one embodiment, an order that the commands are executed by the replay system is realized dynamically during replay based on data dependency information. In this manner, data dependency may be ensured during replay without requiring a global ordering of the commands to be replayed, whether or not those commands are to commit changes. In a particular embodiment, the dependency graph stores pairings of commands including a first command and a second command. During replay, the second command is not executed until the first command has been executed. When there is no direct or indirect data dependency between commands, they may be replayed in any order with respect to each other.

In one embodiment, an indirect dependency between commands does not need to be recorded in order to be enforced. For example, if a third command is from a same thread as an earlier second command, then the third command will follow the second command during replay regardless of whether a dependency is stored between the third command and the second command. In this manner, a dependency that specifies that both the third command and the second command are to be executed after a first command may be enforced by only specifying that the second command is to be executed after the first command.

Capturing Workload

A workload capture and replay architecture is described in the Workload Capture and Replay applications, which have been incorporated by reference herein. These applications describe techniques for capturing a workload of a production system, processing the workload to prepare the workload for replay, replaying the workload on the test system, and monitoring the performance of the test system. The captured workload may include information about the initial state of a database and information that describes a set of calls or database commands made against the database. The captured workload may also include transactional data such as System Change Numbers (SCNs) that describe a relative time at which the calls were received, executed, or committed against the database. The initial state of the database, and the set of issued commands and their associated SCNs define the state of the database against which a given database command was executed.

The techniques described in the Workload Capture and Replay applications cause a test system to process the same workload in the same commit order as the production system. Techniques described herein allow a test system to process a workload in a manner that is not strictly tied to the order of execution by a production system. The techniques described herein for capturing, processing, replaying, and monitoring are not limited by those techniques provided in the Workload Capture and Replay applications.

FIG. 1 is a block diagram that shows an example of a system in which workload that is submitted to a production database server is captured and replayed to a test database server. The example shown includes clients 104A-N, application servers 106A-N, a production database server 108, a production database 112, captured workload 114, replay drivers 116A-N, test database server 118, which includes a replay process for replaying commands received from replay drivers 116A-N, and test database 120. Production database server 108 includes capture processes 110A-N.

Clients 104A-N may be separate computers or separate processes that execute on the same computer. For example, in one embodiment, clients 104A-N are Internet browsers (e.g., Mozilla Firefox) that execute on separate computers that are communicatively coupled to the Internet. In one embodiment, clients 104A-N send requests to, and receive responses from, application servers 106A-N over the Internet.

Application servers 106A-N may be separate computers or separate processes that execute on the same computer. For example, in one embodiment, application servers 106A-N are web server-invoked processes that execute on separate servers that are communicatively coupled to the Internet. In one embodiment, application servers 106A-N receive requests from, and send responses to, clients 104A-N over the Internet. Each of application servers 106A-N may implement different functionality for responding to different types of requests from clients 104A-N.

In servicing requests from clients 104A-N, application servers 106A-N might need to retrieve data from and/or store data to a database. To accomplish this, in one embodiment, application servers 106A-N establish database sessions with production database server 108. Within these sessions, application servers 106A-N send database commands to production database server 108. Such database commands may include Structured Query Language (SQL) select statements, for example.

Production database server 108 executes these database commands relative to production database 112. As a result of the executing these database commands, production database server 108 may store data in, and/or retrieve data from, production database 112. Production database server 108 may execute two or more database commands in a transactional manner, so that none of the effects of the database commands in a single transaction are made permanent in production database 112 unless all of the effects of those database commands can be made permanent. Production database server 108 may return, to application servers 106A-N, data retrieved from production database 112 as a result of the execution of certain database commands (e.g., SQL select statements). Applications servers 106A-N may use such retrieved data in forming responses to clients 104A-N.

In one embodiment, production database server 108 includes capture processes 110A-N. Capture processes 110A-N may be implemented as separate concurrently executing processes or as concurrently executing threads of the same process, for example. In one embodiment, capture processes 110A-N collectively, transparently, and non-intrusively capture all workload that production database server 108 receives from external entities (e.g., application servers 106A-N and/or clients 104A-N).

As used herein, the term "workload" refers to discrete, independently meaningful units called "workload units". In one embodiment, each "workload unit" corresponds to a separate "user request" (e.g., a request originating from (a) one of clients 104A-N, (b) one of application servers 106A-N, or (c) some other process that is external to production database server 108). In one example, the workload includes information that describes one or more commands requested to be executed by the production database server, object identifiers of one or more database objects associated with the one or more commands, and an indication of whether the object identifiers were accessed and/or modified by the one or more commands.

In one embodiment, the information that describes one or more commands includes the actual text of the command, such as the SQL text of a SQL command. Alternately, the information that describes one or more commands may include command identifiers that identify one or more commands or one or more parts of the one or more commands. Optionally, the information that describes the commands may be stored in a binary or compressed format. The information that describes the commands may be stored in any format in any manner, and the commands may be used by a test database system to replay the commands that were originally executed on the production database system. In one embodiment, the commands stored in the captured workload require further processing in order to prepare the commands to be replayed on the test database system.

Capture processes 110A-N store and record this workload as captured workload 114. As a result, captured workload 114 may comprise workload that was captured during a specified interval of time, referred to herein as the "recording interval". In one embodiment, captured workload 114 represents actual real-world use of production database server 108, which use is not specifically for any testing purpose.

In one embodiment, capture processes 110A-N initially write captured workload to in-memory buffers. Data stored in these in-memory buffers is compressed and written out in batches to persistent storage. Because an I/O transaction involving persistent storage does not need to be performed after the capture of every individual workload unit, the impact of the workload capture on the performance of production database server 108 is reduced.

Capturing Information for Determining Data Dependency

Instead of strictly replaying a workload in the same commit order, techniques described herein make replay determinations based on whether one command depends on another command. In one embodiment, a capture process captures information identifying objects that are accessed or modified by commands executed on the production system. The captured information may be part of the captured workload, or the captured information may be captured separately from the captured workload. The captured information may be any information that can be processed to determine that a particular command accessed one or more objects that were last modified by one or more other commands. In one embodiment, the particular command is associated with: (a) a same object identifier as a commit command that committed one or more changes to the object, and (b) a relatively later execution time than the commit command. The particular command and the one or more other commands may be stored in a dependency graph. In one embodiment, the replay process reads the commands and the dependency graph and waits to execute the particular command in the test database system until after one or more other commands, based on the dependency graph, are executed. In one embodiment, replay drivers send commands threads corresponding to clients of the production system. A replay process on the test database system replays commands until the replay process reaches a particular command that cannot yet be executed due to a data dependency between the particular command and a previous command from another thread. The replay process then waits for the previous command from the other thread to be executed, and then executes the particular command upon detection of this event.

The captured information may include any information that identifies a potential or probable data dependency between two commands. In one embodiment, the captured information includes a timing element and a data element. For example, the captured information may include an SCN, an object identifier that identifies an object related to the two or more commands, and an indication of whether each of the two or more commands accessed and/or modified the object.

In one embodiment, a production system captures commands and SCNs associated with the commands, using increasing SCNs as the commands are committed against a database. Commands with lower SCNs are associated with an earlier state of the database than commands with higher SCNs. In one example, an earlier database command commits a change to the database in the production system, and a later database command reads the database in the production system. The SCNs for the commands may be used to determine that the earlier command, with a lower SCN, was executed before the later command, with a higher SCN. In other words, the SCNs may be used to determine a relative timing element for two commands. In the example, the database did not reflect the change before the earlier command, but the database did reflect the change after the earlier command and before the later command.

A particular command may be replayed before other commands in the test system if, in the production system, the other commands did not previously modify an object that was accessed by the particular command. In the example above, the test system may replay the later command before the earlier command so long as the later command is not replayed before any commands that previously modified an object that was accessed by the later command. For example, even though a command to modify Table 1 may have been executed before a command to read or modify Table 2 in the production system, the command to read or modify Table 2 may be replayed before the command to modify Table 1 in the test system because executing the command to modify Table 1 does not affect the outcome of the command to read or modify Table 2.

On the other hand, the command to read or modify Table 2 may not be replayed before a command that previously modified Table 2 in the production system. Replaying the commands out of order may cause the state of the database as maintained by the test system to diverge from the state of the database as maintained by the production system.

In one embodiment, the data dependency determination is made, and the data dependency graph is constructed, based on information that identifies a potential or probable data dependency. In a particular embodiment, cursor information from a transactional cursor associated with the command is used to determine object identifiers that were potentially accessed or modified by the command and an indication of whether those object identifiers were potentially modified or just potentially accessed. For example, a cursor may indicate that an exclusive lock was obtained on Table 1 and a non-exclusive or shared lock was obtained on Table 2 when processing the command. Based on the cursor information, the command can be said to have accessed and modified Table 1 and accessed Table 2 without making a modification to Table 2. In some cases, a command may obtain an exclusive lock on a table without actually modifying the table. In one embodiment, the command is determined to have modified the table due to the exclusive lock that was obtained even if the command did not actually modify the table. In this manner, all potential data dependencies may be preserved by defining the logical data dependencies to include the actual data dependencies but without determining the actual data dependencies. Accordingly, the term "data dependencies," as used herein, may refer to either logical or actual data dependencies.

In one embodiment, the captured object identifiers represent objects that are actually referenced directly or indirectly in the commands. In one example, a command may directly reference a table, and an object identifier that identifies the table may be captured. In another example, a command that references a view may indirectly access a table referenced by the view. An object identifier that identifies the table is captured in order to ensure that the command referencing the view is executed against the proper state of the table referenced by the view. In one embodiment, both direct and indirect references to objects are reflected by the object identifiers associated with the locks.

FIGS. 2A and 2B illustrate example workload information that may be captured from a production database system and processed to generate a dependency graph. As shown, the workload information is stored in a table, for example, a table stored on the computer system shown in FIG. 4. However, a person skilled in the art would understand that such information could be represented in a variety of other ways.

FIG. 2A shows calls as they were executed against a production database. Each commit changes the state of the production database and causes the SCN to increase. For example, the UPDATE T1 call from THREAD 1 does not affect the first READ T1 call from THREAD 2 because the UPDATE T1 call was not committed until after execution of the first READ T1 call from THREAD 2. However, the second and third READ T1 calls from THREAD 2 are affected by the UPDATE T1 call because they are executed after the UPDATE T1 call was committed. Based on the information displayed in FIG. 2A, it may be determined that the second and third READ T1 calls from THREAD 2 must wait for the commit call from THREAD 1. FIG. 2B shows another table that lists the example calls, the tables read by the calls, and the tables written by the calls. As shown, READ T1(2), and READ T1(4) both read table T1 and have SCNs after COMMIT(1), which modifies table T1.

Processing and Replaying Workload

The Workload Capture and Replay applications describe replaying the workload on the test system in the same commit order that the workload was processed by the production system, according to the SCNs captured from the production system. For example, a production system receiving calls from three clients would use three replay drivers to emulate the calls from the three clients on three threads. The calls replayed by all the replay drivers would be executed on the test system in the same global commit order as the calls were executed on the production system.

According to the techniques described herein, the global commit order of the calls in production does not have to be strictly preserved during replay. The replay ordering of the commands does not need to be determined before execution of the commands on the test system. Threads on replay drivers emulate the clients that initially submitted the commands that were executed on the production system. The commands from the different threads are submitted by the replay drivers to the test system during replay. The test system receives the commands and executes the commands in a manner that preserves the dependencies specified by the dependency graph. In this manner, the global order of execution is dynamically realized during playback based on the specified data dependencies.

In one embodiment, if a data dependency cannot be determined for a particular command, then a data dependency is stored that causes the particular command to wait for all commands previously executed before the particular command. In the same or another embodiment, a data dependency is stored that causes all commands previously executed after the particular command to wait for the particular command.

Referring to FIG. 1, after capture processes 110A-N have stored workload in captured workload 114, captured workload 114 may undergo automated processing. This automated processing may be performed in a non-real-time manner. For example, after capture processes 110A-N have finished storing data in captured workload 114, processes external to production database server 108 may process captured workload 114. This processing may be performed while production database server 108 services further requests from application servers 106A-N. Thus, the processing of captured workload 114 may be performed without any interference with or impact on the operations of production database server 108. In one embodiment, processing the workload results in a dependency graph and a list of commands for each of replay drivers 116A-N.

In one embodiment, after captured workload 114 has undergone processing as discussed above, each of replay drivers 116A-N sends commands from the processed workload to test database server 118 in the same manner that the commands were sent to production database server 108 from a respective client of clients 104A-N or a respective application server of application servers 106A-N. Replay drivers 116A-N may be implemented as separate concurrently executing processes or as concurrently executing threads of the same process, for example. In one embodiment, replay drivers 116A-N send their respective commands to the test database server 118, which accesses a dependency graph to preserve dependency without requiring a global ordering of execution of the commands.

In one embodiment, each of replay drivers 116A-N can replay workload that was captured by multiple separate capture processes 110A-N. Therefore, in one embodiment there may be fewer replay drivers 116A-N than capture processes 110A-N. Each of replay drivers 1116A-N may be multi-threaded.

Test database server 118 may be different in one or more respects from production database server 108. For example, test database server 118 might be an upgraded version of production database server 108. For another example, test database server 118 might be the same brand and version of production database server 108, but test database server 118 might be configured differently (e.g., in one or more settings) from production database server 108. For yet another example, test database server 118 might be an entirely different brand of database server from production database server 108. Test database server 118 might execute on a machine that has different hardware than the hardware of the machine on which production database server 108 executes. Test database server 118 might execute in conjunction with a different operating system than the operating system in conjunction with which production database server 108 executes. The purpose of subjecting test database server 118 to the same workload as that to which production database server 108 was actually subjected may be to determine whether the difference between test database server 118 and production database server 108, and/or the difference in the environments in which those database servers execute, is a permissible or desirable difference.

Test database server 118 processes the commands that test database server 118 receives from replay drivers 116A-N. If the workload comprises database commands, then test database server 118 executes the database commands relative to test database 120. As a result of the executing these database commands, test database server 118 may store data in, and/or retrieve data from, test database 120. If the dependency graph specifies that a particular command is to wait for one or more other commands, then test database server 118 waits for the one or more other commands to be executed before executing the particular command to test database server 118. Test database server 118 executes commands from others of replay drivers 116A-N while test database server 118 waits for the one or more other commands to be executed. In response to executing the one or more other commands, test database server 118 detects that the particular command is waiting to be executed and causes the particular command to be executed. Test database server 118 may return, to replay drivers 116A-N, data retrieved from test database 120 as a result of the execution of certain database commands (e.g., SQL select statements).

In the embodiment illustrated in FIG. 1, there is one instance of the production database server and one instance of the test database server. However, in alternative embodiments, there may be multiple production database server instances, all of which perform database operations relative to production database 112. Additionally, in alternative embodiments, there may be multiple test database server instances, all of which perform database operations relative to test database 120. In one embodiment, the number of production database server instances differs from the number of test database server instances.

Test database 120 may be different in one or more respects from production database 112. For example, the manner in which logical relational database structures are physically laid out and stored on disk in test database 120 might differ from the manner in such logical relational database structures are physically laid out and stored on disk in production database 112. Thus, although the values present in the data that is stored in test database 120 will converge to the same as the data that is stored in production database 112, the manner in which those values are stored on disk may differ between the two databases. Additionally, the manner in which relational tables are partitioned in test database server 120 may differ from the manner in which corresponding relational tables are partitioned in production database 112. Additionally, indices that are (or are not) constructed for relational tables in test database 120 may differ from indices that are (or are not) constructed for corresponding relational tables in production database 112. The performance of test database server 118 and/or test database 120 may be evaluated to determine whether the difference between test system and the production system is a permissible or desirable difference.

The recording interval may begin at a time at which production database 112 is already in a certain state. For example, at the time that the recording interval begins, production database 112 might already contain one or more logical data structures (e.g., database tables, stored procedures, triggers, views, indices, etc.) which might already be populated with data. If test database 120 did not also contain these structures in the same state by the time that replay drivers 116A-N begin to "replay" captured workload 114 to test database server 118, then the execution of database commands within the replayed workload relative to test database 120 might produce errors. Therefore, in one embodiment, before replay drivers 116A-N begin to replay captured workload 114 to test database server 118, test database 120 is placed in the same logical state as production database 108. This may be accomplished by "backing up" production database 112 and performing a restore, from the resulting backup data, to test database 120, for example. In one embodiment, such a back up is performed at or shortly prior to the time that the original workload is going to be received at the production database 112. This essentially captures the pre-workload state of production database 112. Consequently, when the backup data is restored relative to test database 120, the state of test database 120 is highly similar to the state in which production database 112 existed prior to the receipt of the original workload.

The time interval during which replay drivers 116A-N replay captured workload 114 to test database server 118 may be completely non-overlapping and non-concurrent with the time interval during which capture processes 110A-N intercept and store that workload. For example, capture processes 110A-N might intercept and record captured workload 114 during a first time interval. Hours, days, or even weeks after the end of that first time interval, replay drivers 116A-N might replay captured workload 114 to test database server 118 during a second time interval that is not concurrent with any part of the first time interval.

In one embodiment, clients 104A-N and application servers 106A-N are not needed to replay captured workload 114 to test database server 118. Because replay drivers 116A-N handle the replaying of captured workload 114 to test database server 118, there is no need to duplicate clients 104A-N or application server 106A-N in the replay system. This advantageously saves resources.

Figure 3B:
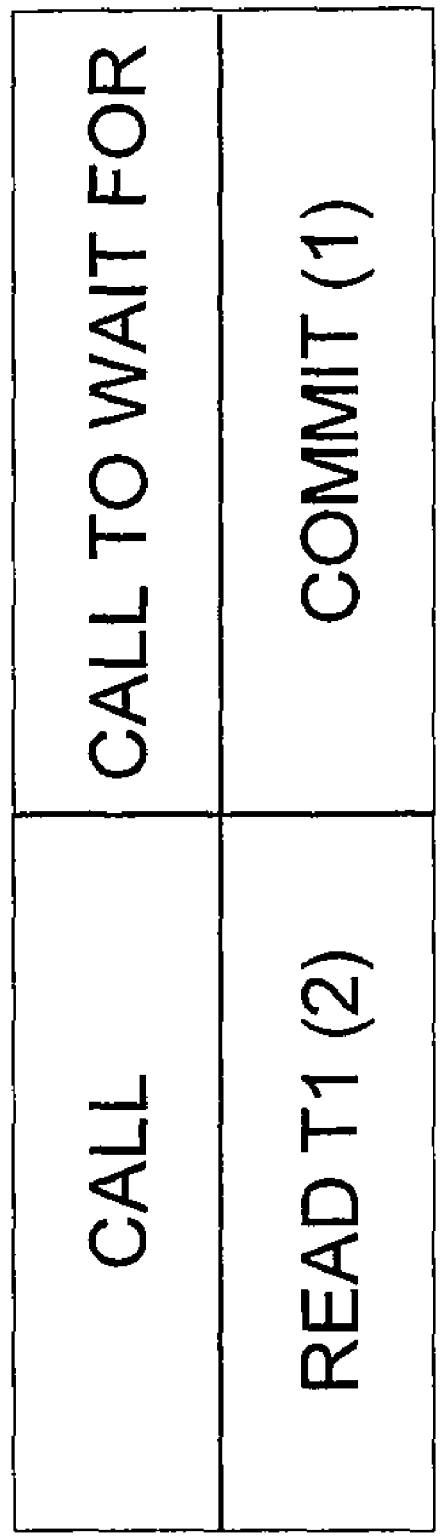

FIGS. 3A and 3B illustrate an example dependency graph that lists calls and calls to wait for. For example, information from FIGS. 2A and 2B may be used to construct a dependency graph as illustrated in FIG. 3A, which specifies that the READ T1(2), READ T1(3), and READ T1(4) calls all wait on the COMMIT(1) call. As shown, the dependency graph is stored in a table, for example, a table stored on the computer system shown in FIG. 4. However, a person skilled in the art would understand that such information could be represented in a variety of other ways.

The dependency graph may be optimized by removing redundant information from the graph. For example, let the notation "B->A" mean that call B waits for call A before being executed. If B->A and B->C, then the entry B->C may be removed from the graph if (1) C comes from the same thread as A and (2) C's call counter is less than A. In other words, if call A is sent after call C by the same thread, then it would be redundant to explicitly specify that call B is to wait for both calls A and C. In this case, waiting for call A implies also waiting for call C. In one embodiment the graph stores only B->A and not B->C.

As another example, assuming B->A and D->A, the entry D->A may be removed from the graph if (1) D comes from the same thread as B and (2) D's call counter is greater than B. In other words, if call D is sent after call B in the same thread, then it would be redundant to explicitly specify that call A is to be executed before both calls B and D. In this case, executing call A before call B implies also executing call A before call D. In one embodiment, the graph stores only B->A and not D->A.

As yet another example, the dependency B->A may be removed from the dependency graph if A and B are from the same thread because, in one embodiment, the order of execution of calls from the same thread is preserved.

As shown by comparing FIG. 3A and FIG. 3B, in the example, the READ T1(3) call is removed from the dependency graph because the READ T1(3) call appears in the same thread as the COMMIT(1) call and will be replayed after the COMMIT(1) call even without the use of the dependency graph. Also, the READ T1(4) call is removed from the dependency graph because the READ T1(4) call appears in the same thread as the READ T1(2) call and will be replayed after the READ T1(2) call even without use of the dependency graph. Using the dependency graph, the test database system will replay the READ T1(2) call after the COMMIT (1) call.

When executing the READ T1(2) call, the test database system uses the dependency graph to determine that READ T1(2) depends on COMMIT(1). Then, the test database system determines whether or not COMMIT(1) has already been replayed. If COMMIT(1) has not yet been replayed, the test database system waits to execute READ T1(2) until COM-MIT(1) is replayed. The test database system may execute any or all of the READ T2, UPDATE T2, and COMMIT(2) calls from PROCESS 3 before the COMMIT(1) call even though these calls came after the COMMIT(1) call in the production system. Prior execution of these commands to modify table T2 does not affect execution of commands relating to table T1.

In one embodiment, each respective replay driver stores those commands that were submitted by the corresponding client in the production system. For example, the replay driver associated with THREAD 1 stores those commands that were submitted by the first thread in the production system, and the replay driver associated with THREAD 2 stores those commands that were submitted by the second thread in the production system. The test database server stores a portion of the dependency graph that specifies that READ T1(2) from THREAD 2 is to wait for COMMIT(1) from THREAD 1. When the test database system replays the commands, the test database system waits to execute the READ T1(2) command until COMMIT(1) has been executed.

Monitoring Performance

The Workload Capture and Replay applications further describe monitoring the performance of the test system and making a determination of whether or not to replace the production system with the test system. For example, the determination to replace the production system with the test system may be made when the test system exhibits a good performance when processing the same workload as the production system. The techniques described herein do not require monitoring performance of the test system or the production system. If performance of either system is monitored, any known or later developed performance monitoring technique may be used in conjunction with the techniques described herein.

In one embodiment, the state of the test database is compared to the state of the production database to ensure that the state of the test database converges to the state of the production database. In the same or another embodiment, results of executing commands in the test environment may be compared to results of executing commands in the production environment. In yet another embodiment, the relative timing that commands were executed in the test system may be compared to the relative timing that commands were executed in the production system.

The performance data may be used to determine whether or not to use a test database system as a production database system. For example, the test database system may be determined to exhibit good performance as compared to the production database system if the state of the test database converges to the state of the production database, if the test database system runs more efficiently or processes commands more quickly than the production database system.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
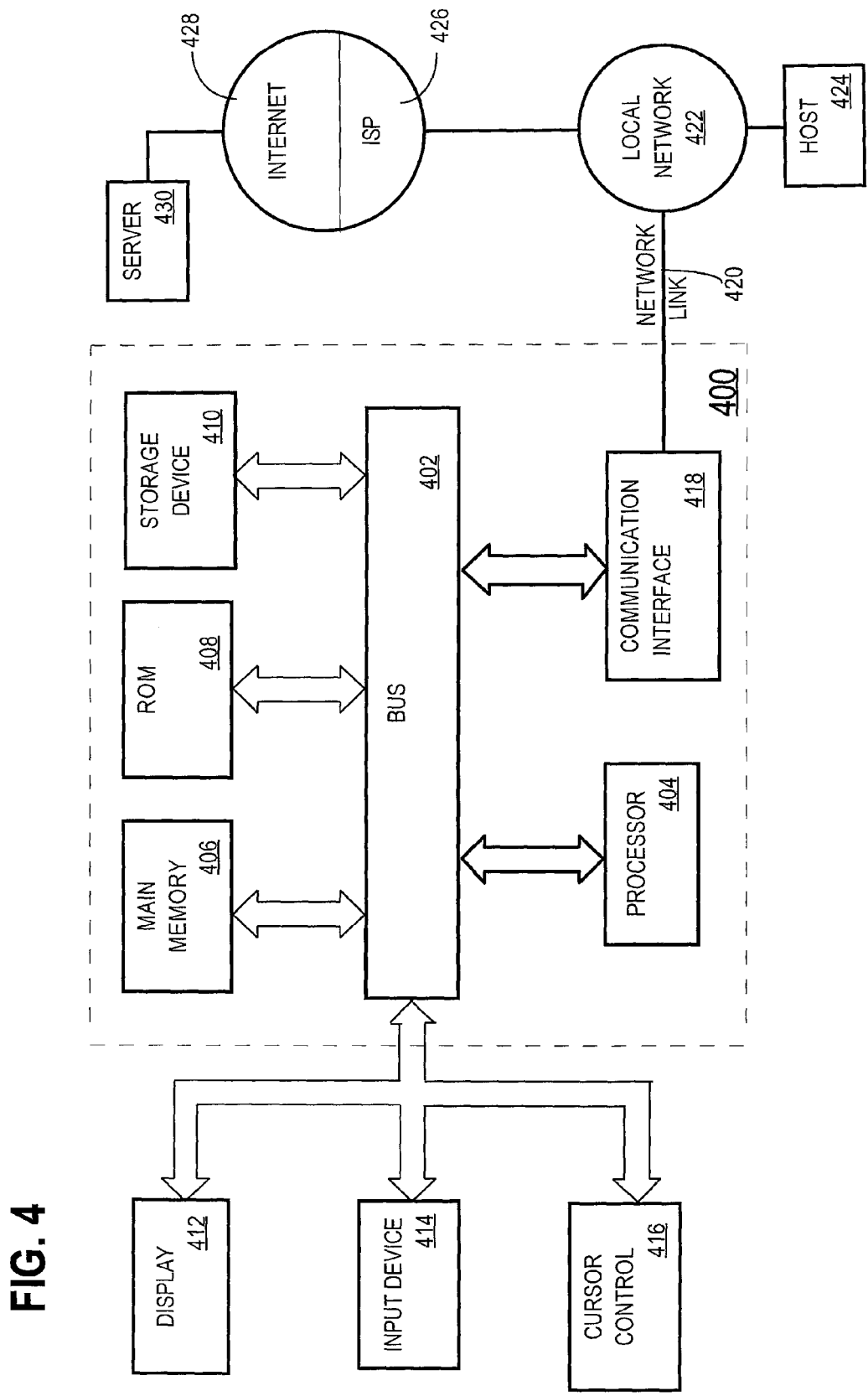
FIG. 4 is a block diagram that illustrates a computer system upon which an embodiment described herein may be implemented.

For example, FIG. 4 is a block diagram that illustrates a computer system 400 upon which techniques described herein may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense.

What is claimed is:

1. A method of capturing and processing database commands executed against a database by one or more database servers, the method comprising:
   storing information that identifies:
      one or more database objects that were modified by a first database command executed by the one or more database servers that executed commands against the database; and
      one or more database objects that were accessed by a second database command executed by the one or more database servers that executed commands against the database;
   based at least in part on the stored information, determining that the second database command depends on the first database command by:
      determining that the second database command accessed a database object that was previously modified by the first database command;
   based at least in part on determining that the second database command depends on the first database command, storing, in a dependency graph, an entry for the second database command that specifies the first database command;
   wherein the dependency graph stores a plurality of entries, wherein each entry is for a separate database command, and wherein each entry specifies one or more other database commands from which the separate database command depends;
   wherein the dependency graph, if used during replay, would prevent the second database command from being executed until after execution of the first database command;
   wherein the method is performed by one or more special-purpose computing devices.

2. The method of claim 1, further comprising:
   based on the dependency graph, preventing the second database command from being executed until after execution of the first database command during a replay of the database commands.

3. The method of claim 1, further comprising:
   based on the dependency graph, triggering the second database command to be executed after execution of the first database command during a replay of the database commands.

4. The method of claim 1, further comprising, during a replay of the database commands:
   receiving the second database command to be executed;
   determining that the first database command has not been executed during the replay;
   in response to determining that the first database command has not been executed during the replay, waiting to cause execution of the second database command;
   after the waiting, determining that the first database command has been executed during the replay;
   in response to determining that the first database command has been executed during the replay, causing execution of the second database command.

5. The method of claim 4, wherein determining that the first database command has not been executed comprises:
   accessing a counter that records a count of a most recently executed command by a thread associated with the first database command.

6. The method of claim 1, wherein the database object that was previously modified by the first database command is a table that was exclusively locked during execution of the first database command by the one or more database servers.

7. The method of claim 1, the method further comprising:
   determining that a third database command depends on both the first database command and the second database command; and
   based at least in part on (a) determining that the third database command depends on both the first database command and the second database command and (b) determining that the second database command depends on the first database command, storing, in the dependency graph, an entry for the third database command that specifies the second database command but not the first database command.

8. The method of claim 1, the method further comprising:
   determining that the second database command also depends on a third database command; and
   wherein the stored entry also specifies the third database command.

9. One or more storage media storing instructions which, when executed by one or more computing devices, cause performance of capturing and processing database commands executed against a database by one or more database servers by causing performance of:
   storing information that identifies:
      one or more database objects that were modified by a first database command executed by the one or more database servers that executed commands against the database; and
      one or more database objects that were accessed by a second database command executed by the one or more database servers that executed commands against the database;
   based at least in part on the stored information, determining that the second database command depends on the first database command by:
      determining that the second database command accessed a database object that was previously modified by the first database command;
   based at least in part on determining that the second database command depends on the first database command, storing, in a dependency graph, an entry for the second database command that specifies the first database command;
   wherein the dependency graph stores a plurality of entries, wherein each entry is for a separate database command, and wherein each entry specifies one or more other database commands from which the separate database command depends;
   wherein the dependency graph, if used during replay, would prevent the second database command from being executed until after execution of the first database command.

10. One or more storage media as recited in claim 9, wherein the instructions, when executed by one or more computing devices, further cause performance of:
   based at least in part on the dependency graph, preventing the second database command from being executed until after execution of the first database command during a replay of the database commands.

11. One or more storage media as recited in claim 9, wherein the instructions, when executed by one or more computing devices, further cause performance of:
based at least in part on the dependency graph, triggering the second database command to be executed after execution of the first database command during a replay of the database commands.

12. One or more storage media as recited in claim 9, wherein the instructions, when executed by one or more computing devices, further cause performance of, during a replay of the database commands:
receiving the second database command to be executed;
determining that the first database command has not been executed during the replay;
in response to determining that the first database command has not been executed during the replay, waiting to cause execution of the second database command;
after the waiting, determining that the first database command has been executed during the replay;
in response to determining that the first database command has been executed during the replay, causing execution of the second database command.

13. One or more storage media as recited in claim 12, wherein the instructions, when executed by one or more computing devices, cause performance of determining that the first database command has not been executed by:
accessing a counter that records a count of a most recently executed command by a thread associated with the first database command.

14. One or more storage media as recited in claim 9, wherein the database object that was previously modified by the first database command is a table that was exclusively locked during execution of the first database command by the one or more database servers.

15. One or more storage media as recited in claim 9, wherein the instructions, when executed by one or more computing devices, further cause performance of:
determining that a third database command depends on both the first database command and the second database command; and
based at least in part on (a) determining that the third database command depends on both the first database command and the second database command and (b) determining that the second database command depends on the first database command, storing, in the dependency graph, an entry for the third database command that specifies the second database command but not the first database command.

16. One or more storage media as recited in claim 9, wherein the instructions, when executed by one or more computing devices, further cause performance of:
determining that the second database command also depends on a third database command; and
wherein the stored entry also specifies the third database command.

17. An apparatus configured to capture and process database commands executed against a database by one or more database servers, the apparatus comprising:
one or more processors;
one or more storage devices storing information that identifies:
one or more database objects that were modified by a first database command executed by one or more database servers that executed commands against the database; and
one or more database objects that were accessed by a second database command executed by the one or more database servers that executed commands against the database;
the one or more storage devices storing instructions which, when executed by the one or more processors, cause the one or more processors to perform:
based at least in part on the stored information, determining that the second database command depends on the first database command by:
determining that the second database command accessed a database object that was previously modified by the first database command;
based at least in part on determining that the second database command depends on the first database command, storing, in a dependency graph, an entry for the second database command that specifies the first database command;
wherein the dependency graph stores a plurality of entries, wherein each entry is for a separate database command, and
wherein each entry specifies one or more other database commands from which the separate database command depends;
wherein the dependency graph, if used during replay, would prevent the second database command from being executed until after execution of the first database command.

18. The apparatus of claim 17, wherein the one or more storage devices also store instructions that cause the one or more processors to perform:
based on the dependency graph, preventing the second database command from being executed until after execution of the first database command during a replay of the database commands.

19. The apparatus of claim 17, wherein the one or more storage devices also store instructions that cause the one or more processors to perform:
based on the dependency graph, triggering the second database command to be executed after execution of the first database command during a replay of the database commands.

20. The apparatus of claim 17, wherein the database object that was previously modified by the first database command is a table in the database.

21. The apparatus of claim 17, wherein the one or more storage devices also store instructions that cause the one or more processors to perform, during a replay of the database commands:
receiving the second database command to be executed;
determining that the first database command has not been executed during the replay;
in response to determining that the first database command has not been executed during the replay, waiting to cause execution of the second database command;
after the waiting, determining that the first database command has been executed during the replay;
in response to determining that the first database command has been executed during the replay, causing execution of the second database command.

22. The apparatus of claim 21, wherein the one or more storage devices store instructions that cause the one or more processors to perform determining that the first database command has not been executed at least in part by:
accessing a counter that records a count of a most recently executed command by a thread associated with the first database command.

23. The apparatus of claim 17, wherein the one or more storage devices also store instructions that cause the one or more processors to perform:

determining that a third database command depends on both the first database command and the second database command; and based at least in part on (a) determining that the third database command depends on both the first database command and the second database command and (b) determining that the second database command depends on the first database command, storing, in the dependency graph, an entry for the third database command that specifies the second database command but not the first database command.

24. The apparatus of claim 17, wherein the one or more storage devices also store instructions that cause the one or more processors to perform:

determining that the second database command also depends on a third database command; and wherein the stored entry also specifies the third database command.

\* \* \* \* \*

UNITED STATES PATENT AND TRADEMARK OFFICE
CERTIFICATE OF CORRECTION

| | | |
|---|---|---|
| PATENT NO. | : 8,326,816 B2 | Page 1 of 1 |
| APPLICATION NO. | : 12/775322 | |
| DATED | : December 4, 2012 | |
| INVENTOR(S) | : Colle et al. | |

It is certified that error appears in the above-identified patent and that said Letters Patent is hereby corrected as shown below:

On front page, in column 2, under "Other Publications", line 1, delete "at.al.," and insert -- et. al., --, therefor.

On page 2, in column 1, under "Other Publications", line 3, delete "Notive" and insert -- Notice --, therefor.

In column 1, line 28, delete "Tranactional" and insert -- Transactional --, therefor.

Signed and Sealed this
Twelfth Day of March, 2013

Teresa Stanek Rea
*Acting Director of the United States Patent and Trademark Office*